United States Patent [19]

Assaf

[11] Patent Number: 4,553,529
[45] Date of Patent: Nov. 19, 1985

[54] METHOD OF AN APPARATUS FOR DYNAMICALLY STABILIZING THE WIND-MIXED LAYER OF A SALT-WATER SOLAR POND

[75] Inventor: Gad Assaf, Rehovot, Israel
[73] Assignee: Solmat Systems Ltd., Yavne, Israel
[21] Appl. No.: 396,759
[22] Filed: Jul. 9, 1982
[51] Int. Cl.$^4$ ................................................. F24J 3/02
[52] U.S. Cl. ...................................... 126/415; 60/641.8
[58] Field of Search ............... 126/415, 436; 60/641.8, 60/641.9; 159/15

[56] References Cited
U.S. PATENT DOCUMENTS

| | | | |
|---|---|---|---|
| 4,244,351 | 1/1981 | Loeb et al. | 126/415 |
| 4,328,788 | 5/1982 | Wirguin et al. | 126/415 |
| 4,377,071 | 3/1983 | Assaf et al. | 60/641.8 |

Primary Examiner—Margaret A. Focarino
Attorney, Agent, or Firm—Sandler & Greenblum

[57] ABSTRACT

The wind-mixed layer of a salt-water solar pond is dynamically stabilized against wind by creating a two-layer flow regime in the wind-mixed layer. Lighter less dense water flows in one direction adjacent the surface of the pond and heavier, more dense water flows in the opposite direction beneath the lighter water. The two-layer flow regime can be created by selectively connecting the wind-mixed layer to a source of brine whose density exceeds the average density of water in the wind-mixed layer. Alternatively, the two-layer flow regime is created by selectively adding fresher water to the surface of the solar pond at the surface thereof to replace evaporation losses.

8 Claims, 7 Drawing Figures

METHOD OF AN APPARATUS FOR DYNAMICALLY STABILIZING THE WIND-MIXED LAYER OF A SALT-WATER SOLAR POND

TECHNICAL FIELD

This invention relates to a method of and apparatus for dynamically stabilizing the wind-mixed layer of a salt-water solar pond.

BACKGROUND OF THE INVENTION

Artificial salt water solar ponds are presently used as solar collectors in order to provide a source of low grade heat for conversion into electricity. Such ponds have a 3-layer regime: an upper convective wind-mixed layer at the surface with an average salinity of 3–5%, and with a depth of 30–50 cm., depending upon wind conditions; an intermediate, non-convective layer termed a halocline, about 1–1.5 m. deep, with a salinity that increases uniformly with depth from about 5% at the top to about 30% at the bottom; and a lower heat-storage layer, from 3–5 m. deep, depending on the amount of heat storage desired, with a uniform salinity of about 30%.

Solar radiation incident on the surface is absorbed within the layers. Heat absorbed within a stratum of the wind-mixed layer reduces the density of the stratum, and creates buoyant water which quickly reaches the surface, dissipating the absorbed heat into the atmosphere. Thus, the temperature of the wind-mixed layer approximates ambient temperature. However, heat absorbed in the halocline and in the heat-storage layer is trapped in these layers. The halocline is nonconvective because the density based stratum is so large, compared with the stratum immediately above, that any decrease in density is due to a temperature rise in the lower stratum as a consequence of the absorption of solar radiation is insufficient to materially change its buoyancy. As a result, solar radiation establishes a temperature profile that matches the salinity profile, in the pond. The halocline thus serves as a transparent, insulating cover for the heat-storage layer, and protects the latter against conductive heat loss to the atmosphere. From actual experience with solar ponds, the halocline is remarkably stable for long periods of time, because the rate of salt diffusion is so slow. However, the halocline is particularly sensitive to the effects of wind at the surface. Gusts of wind that create surface waves cause mixing at the surface and which increases the depth of the wind-mixed layer at the expense of a halocline. By driving the wind-mixed layer deeper into the halocline, the average density of the water in the wind-mixed layer increases, and it is conventional to attempt to repair this damage to the halocline by flushing the surface with fresh water, and/or carrying out a selective mixing process at the interface between the wind-mixed layer and the halocline.

The primary reason for attempting to minimize the depth of the wind-mixed layer arises because the rate at which heat can be added to the heat-storage layer from solar radiation is reduced as the wind-mixed layer depth increases. It has been found that an increase of one centimeter in the depth of the wind-mixed layer may reduce the thermal head achieved by the solar pond by about 1° C. When the thermal head is in the neighborhood of about 50° or 60° C., this reduction in thermal head is very costly in terms of the operation of the solar pond.

In an effort to control the depth of the mixed-layer, it is conventional to utilize surface windbreaks; and to this end, nets of low hyper-density polypropylene, for example, have been floated on the surface of the pond. These nets are anchored on the banks or rim of the pond and have proven to be effective in reducing the effect of wind mixing. However, a number of problems have developed with this approach. First of all, the cross-pieces of the net must be relatively close to supress wind formation with the result that the shadow cast by the nets may represent as much as 5% of the total area of the pond; and the nets thus reduce the efficiency of the pond as a collector. In addition, the mineral precipitates collect on the exposed surface of the nets, increasing their weight and causing them to sink below the surface where their effectiveness as a wave suppressor is reduced.

Much effort has been expended in an effort to minimize the depth of a wind-mixed layer in a salt water solar pond; but to date the problem still exists. It is therefore an object of the present invention to provide a new and improved method of and apparatus for dynamically stabilizing the wind mixed layer of a salt water solar pond in a way that does not suffer from the deficiencies of the prior art.

DISCLOSURE OF INVENTION

In accordance with the present invention, the convective wind-mixed layer of a salt water solar pond, which covers a nonconvective halocline, is dynamically stabilized, by creating a two-layer flow regime in the wind-mixed layer whereby lighter, less dense water flows in one direction adjacent to the surface of the pond, and heavier, more dense water flows in a different direction, usually the opposite direction beneath the lighter water. In one embodiment of the invention, the two-layer flow regime is created by selectively connecting the wind-mixed layer to a source of brine whose density exceeds the average density of the water in the wind-mixed layer. In another embodiment of the invention, the two-layer flow regime is created by selectively adding fresher water to the surface of the pond to replace evaporation losses.

The invention is enhanced by dividing the surface of the pond into a plurality of separate regions which are interconnected near the surface in a way that simulates the flow characteristics of a strait interconnected to the bodies of water. The theory of two-layer flow in estuaries is given by an STOMMEL and FARMER (*Journal of Marine Research*, 11,205–214 1957) and for sea straits by ASSAF and HECHT (*Deep Sea Research*, Vol. 21, 947–948 1974).

The theory for the two-layer flow regime in the wind-mixed layer is summarized by ANATI ASSAF and THOMPSON (J. Fluid Mech., 1977) which shows that the size of the opening controls the mixed-layer regime. The two-layer flow established tends to maximize the exchange between the two basins connected by the opening subject to the condition that the velocity difference does not exceed the critical Froud flow. As a consequence of the two-layer flow which permits some mixing in the wind-mixed layer, a thermal gradient will exist across the wind-mixed layer and will thus elevate the thermal head of the pond.

BRIEF DESCRIPTION OF THE DRAWINGS

Embodiments of the present invention are shown in detail in the accompanying drawing wherein.

DETAILED DESCRIPTION

Figure 1:
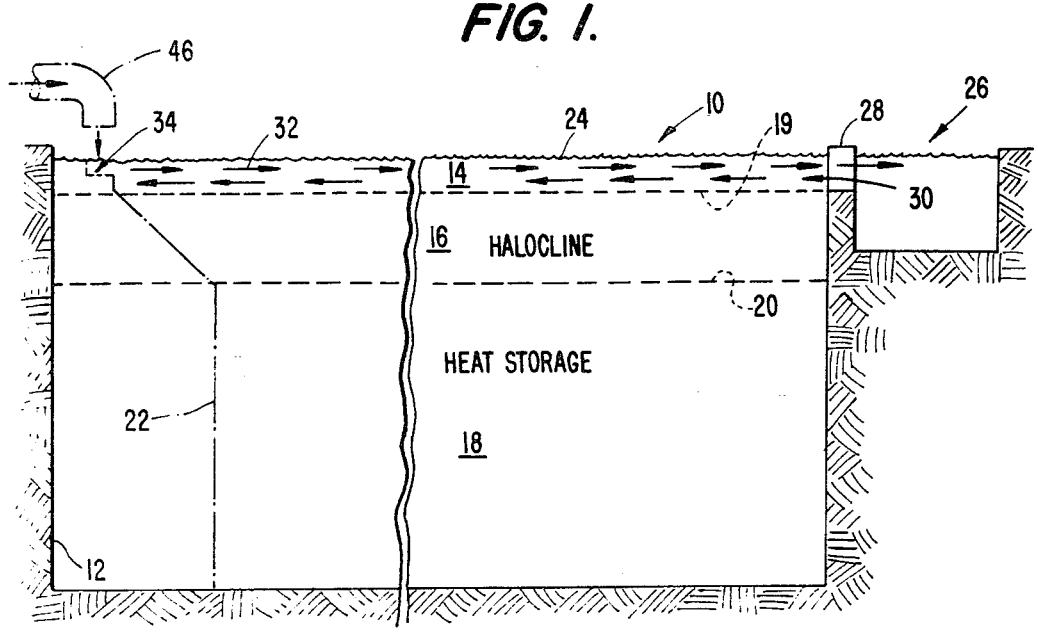
FIG. 1 is a sectional schematic view of a salt water solar pond in accordance with the present invention.

Referring now to FIG. 1, reference numeral 10 designates a conventional salt-water solar pond. The pond is contained within rim or banks 12 and has a three-layer regime, designated by reference numerals 14, 16 and 18. Layer 14, at the surface, is a wind-mixed layer of average salinity of 3–5%, and a depth of 30–50 cm. depending on wind condition. Intermediate layer 16, below wind mixed-layer 14, is termed the halocline. It is a nonconvective layer about 1–1.5 m. deep, with a salinity that increases uniformly with depth from about 5% at the top, which is designated by reference numeral 19, to around 30% near the bottom which is designated by reference numeral 20. Finally, layer 18, which is termed the heat storage layer, is from 0.5–5 m. deep, depending on the amount of heat storage desired. The salinity of the heat storage layer is uniform at about 30%. For reference purposes, the salinity profile is shown in FIG. 1 by curve 22.

As is well known, solar radiation incident on surface 24 of the solar pond is absorbed in the various layers of the solar pond. Heat absorbed in wind-mixed layer 14 is quickly dissipated to the atmosphere because layer 14 is convective, and heated water quickly rises to the surface because it is lighter than the surrounding water, and the heat is dissipated to the ambient atmosphere. The temperature of layer 14, in the usual solar pond, thus approximates ambient temperature. The temperature in the halocline, however, increases with depth, the increasing density of the water in the halocline with depth serving to prevent convection currents there within. Thus, the temperature profile of the solar pond closely matches the salinity profile shown by curve 22. Finally heat in the heat storage layer can be removed in a number of conventional ways for useful purposes.

The depth of wind-mixed layer 14 affects the efficiency of the pond as a solar collector and the temperature gradient of the halocline. It can be shown that an increase of 1 cm. in the depth of the mixed layer reduces the thermal head of the pond by about 1° C. Therefore, efficient operation of the pond requires minimization of the depth of the wind-mixed layer. This depth is usually determined by the intensity of wind-mixing; and heretofore, the efficacy of any wind protection system on the surface of the pond will determine the depth of the wind-mixed layer.

In one aspect of the present invention, wind-mixed layer 14 is connected to reservoir 26 of brine which has a density greater than the average density of the water within mixed layer 14. Reservoir 26 is connected to wind-mixed layer 14 by a gate 28 the depth of which is comparable to the depth of wind-mixed layer. The presence of the denser brine 30 in reservoir 26, and gate 28 are effective to induce a circulation between reservoir 26 and wind-mixed layer 14 through the gate. The circulation will be a two-layer flow regime as suggested by arrows 32 in FIG. 1. That is to say, the more dense brine in reservoir 26 will flow therefrom into the region above interface 19 of halocline 16, inducing an upwelling of denser brine in the mixed layer thereby stabilizing this layer. Lighter water will flow in the opposite direction toward gate 28 as indicated by the arrows in FIG. 1, thereby establishing a salinity profile in the mixed-layer having a step-like shape as indicated by reference numeral 34. It is likely that the dynamic stabilization so achieved by reason of the two-layer flow regime that exists in the wind-mixed layer will allow some mixing across it. Nevertheless, it will maintain the thermal gradient across the upper layer and will elevate the thermal head of the pond.

Figure 2A:
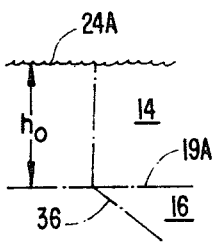
FIGS. 2(A–D) are sequential views of the wind-mixed layer showing the salinity profile therethrough as a function of wind-mixing and as a consequence of a two-layer flow regime established in accordance with the method and apparatus of the present invention.
Figure 2B:
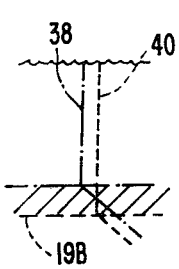

Referring now to FIG. 2(A), which represents a section through wind-mixed layer 14, curve 36 shows the salinity profile in a conventional salt-water solar pond, i.e., a pond without the dynamic stabilization arising from the two-layer flow referred to above. Due to the effect of wind on surface 24' of the pond, the wind-mixed layer is agitated further thereby driving the interface 19(B) between the halocline 16 and the wind-mixed layer into the pond as indicated in FIG. 2(B). The denser water in the layer indicated by the cross-hatched region distributed into the water in the wind-mixed layer thereby increasing its salinity from the level shown by curve 38 to the level indicated by curve 40. As described above, the wind-mixed layer will now absorb a greater percentage of heat with the result that less heat will be available for the transfer to the heat storage layer. This is an undesirable situation which is dynamically compensated for in the manner illustrated in FIG. 2(C).

Figures 2C, 2D:
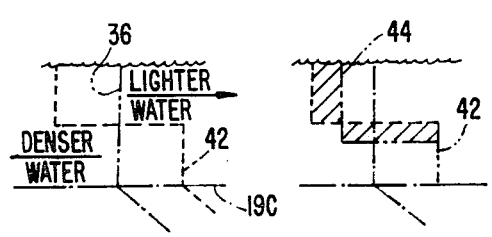

The original salinity profile through the wind-mixed layer is shown by reference numeral 36, but the more dense brine from reservoir 26 flowing adjacent interface 19C increases the density of the water in the lower portion of the wind-mixed layer while lighter water flowing above the denser water decreases the density as indicated by curve 42 in FIG. 2(C). Under the conditions shown in FIG. 2(C), the effect of wind is resisted as indicated in FIG. 2(D). Specifically, step-profile 42 is modified by wind-mixing which drives the lighter water deeper into the denser water, creating new profile 44. Specifically, the salinity of the water near the surface is increased due to a mixing of the more dense water into the upper portion. This has the advantageous effect of preventing the wind from eroding the halocline. In effect, the wind erodes the flowing denser water in the wind-mixed layer rather than the halocline. As a consequence, the arrangement described above is effective in increasing the efficiency of the pond as a solar collector.

Instead of utilizing reservoir 26 for the purpose of providing brine which is more dense on the average than the water in the wind-mixed layer, continual flushing of the surface of pond 24 shown in FIG. 1 with fresher water as shown by pipe 46 will achieve the same result. That is to say, by supplying fresh water at a rate that equals the evaporation loss from the surface of the pond, a two-layer flow regime will be set up in the wind-mixed layer in a manner similar to that created by reservoir 26.

Figure 3:
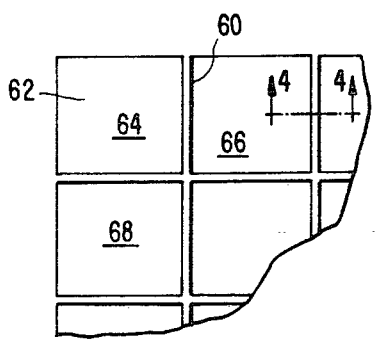
FIG. 3 is a plan view of a portion of a solar pond in accordance with the present invention in which the surface is divided by partitions into separate regions inter-connected by openings in the partitions.
Figure 4:
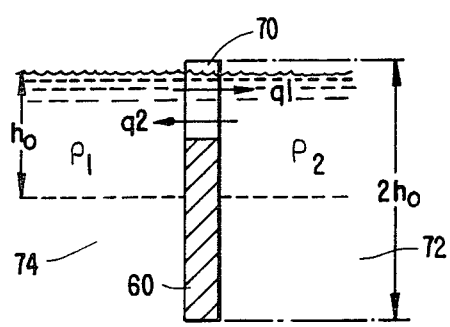
FIG. 4 is a detail of the partitions dividing the pond into separate regions showing how the opening in a partition is sufficient to establish a two-layer flow regime in the wind-mixed layer.

The preferred arrangement for the dynamic stabilization of the wind-mixed layer of the pond is shown in FIGS. 3 and 4, wherein the surface of the pond is divided by floating partitions into regions each of which has different surface densities. A region which has the denser water than and adjacent region exchanges brine with the adjacent regions. The exchange between regions is regulated in accordance with the openings in the partitions, which allow two-way flow, or two-layer flow, in a way similar to the exchange of water between a basin and the sea through a strait.

FIG. 3 shows an arrangement of floating partitions 60 in pond 62 thereby dividing the surface of the pond into a plurality of separate regions labelled 64, 66, 68 .... These partitions are preferably of semi-rigid material such as polystyrene, with a depth about twice the average depth of the wind-mixed layer. Intermediate partitions 60 are openings 70 which interconnect adjacent regions 72 and 74. Assuming the density in the wind-mixed layer of region 72 exceeds the density on the average in the wind-mixed layer in 74, a flow $q_2$ is induced between region 72 and region 74 in a direction toward the region with the lower density. This flow is accompanied by a flow in the opposite direction $q_1$ near the surface of the pond. This two-layer flow through opening 70 is similar to the flow through a strait as described in the journal articles described above. The theory of flow through straits predicts that the flow is limited to critical internal Froud conditions where the flow rate does not exceed the speed of interfacial waves between the upper and lower layers. That is to say, the flow approaches, but does not exceed the following conditions:

$$U_1^2/(g'D_1) + U_2^2/(g'D_2) = 1 \quad (1)$$

where $U_1$ is the outward velocity of the upper layer and $U_2$ is the inwardly directed velocity in the lower layer, $D_1$ and $D_2$ are the depths of the two layers, respectively, and $g'$ is the reduced gravity of the lower layer with respect to the upper layer. That is to say, $g' = g\Delta\rho/\rho$) where $\rho$ is the reference density and $\Delta\rho$ is the density difference between the two layers.

It can be shown, from the literature cited above, that, taking the water, salt and heat balance of the two regions into consideration with the critical condition set forth in Eq. (1), the straits equation can be obtained:

$$1/1(1-N)^3 + S^2/N^3 = (S-1)^3/F_p \quad (2)$$

where $N = D_1/D$, $S = S_2/S_1$ and the quantity $F_p$ is as follows:

$$F_p = m_o^2/(\rho^2 a^2 gD(\rho_s S_1 + \alpha_T h)) \quad (3)$$

where $F_p$ is the potential Froud number of the opening in an area of the strait. The strait equation relates the salinity ratio S to the nondimensional interfacial depth N. The parameters $m_0$ and $h$, and the salinity of the region $s_2$ are parameters external to the other region and relate to climatic conditions while the parameters $U_1$ D and A are parameters of the strait. Thus, for a given climate and strait, (2) provides the relationship between S and N. There are an infinite number of pairs of these numbers which satisfy (2). However, nature determines the values of S and N through the rate of vertical mixing. Such mixing is dependent on the rate at which kinetic energy is introduced into the basin by the action of the wind.

The table that follows lists some solutions to (1) under the condition that one of the regions has an area of 12,000 m² for various rates of evaporation.

| EVAP cm/day | $M_o$ | D (m) | a (m²) | $S_1$ | $S_2$ | S | N | $F_p$ |
|---|---|---|---|---|---|---|---|---|
| 0.6 | 0.83 | 0.2 | 0.04 | 40 | 60 | 1.5 | 0.55 | 0.005 |
| 0.3 | 0.42 | 0.2 | 0.02 | 40 | 60 | 1.5 | 0.55 | 0.005 |
| 1.2 | 1.62 | 0.2 | 0.08 | 40 | 60 | 1.5 | 0.55 | 0.005 |

Essentially, it turns out that the cross-section area of the opening in a partition is approximately 0.04 m². In practice this would translate to an opening 20 cm long by 20 cm. deep. This is a practical solution, because the separate regions shown in FIG. 3 about 100 meters by 100 meters.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, wherein the two-layer flow regime is created by selectively connecting the wind-mixed layer to a source of brine whose salinity exceeds the average salinity of water in the wind-mixed layer.

2. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, wherein the two-layer flow regime is created by selectively adding fresher water to the solar pond at the surface thereof to replace evaporation losses.

3. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, including dividing the surface of the pond into a plurality of separate regions, and interconnecting regions near the surface, whereby an exchange of water between the regions can take place through the interconnection.

4. A solar pond comprising:
(a) a convective wind-mixed layer of water on the surface of the pond;
(b) a non-convective halocline covered by the wind-mixed layer having a density that increases with depth;

(c) a heat storage layer under the halocline for storing heat created in the pond by the absorption of solar radiation;

(d) means for establishing a two-layer flow regime in the wind-mixed layer due to a difference in salinity, whereby lighter less dense water flows in one direction adjacent the surface of the pond, and heavier, more dense water, flows in a different direction beneath the lighter water;

(e) the means for establishing the two-layer flow regime including a reservoir containing brine whose salinity exceeds the average salinty of water in the wind-mixed layer; and (f) wherein the reservoir is connected to the solar pond via a gate whose depth is no greater than the depth of the wind-mixed layer.

5. A solar pond comprising:

(a) a convective wind-mixed layer of water on the surface of the pond;

(b) a non-convective halocline covered by the wind-mixed layer having a density that increases with depth;

(c) a heat storage layer under the halocline for storing heat created in the pond by the absorption of solar radiation;

(d) means for establishing a two-layer flow regime in the wind-mixed layer due to a difference in salinity, whereby lighter less dense water flows in one direction adjacent the surface of the pond, and heavier, more dense water, flows in a different direction beneath the lighter water; and (e) partitions floating in the pond for dividing at least the surface of the pond into a plurality of separate regions, and interconnecting adjacent regions at the surface of the pond.

6. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, wherein the two-layer flow regime is created by selectively connecting the wind-mixed layer to a source of brine, whose temperature is substantially the same as the temperature of the wind-mixed layer.

7. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, wherein the two-layer flow regime is created by selectively connecting the wind-mixed layer to a source of brine, whose salinity exceeds the average salinity of the wind-mixed layer.

8. A method for dynamically stabilizing the convective wind-mixed layer of a salt-water solar pond, which covers a nonconvective halocline, the method comprising creating a two-layer flow regime in the wind-mixed layer due to differences in salinity, whereby lighter less dense water flows in one direction adjacent the surface of the pond, and heavier, more dense water, flows in a different direction beneath the lighter water, wherein the two-layer flow regime is created by selectively connecting the wind-mixed layer to a source of brine, whose salinity is such that lighter less dense water adjacent the surface the pond flows into the source of brine.

* * * * *